US010747343B2

(12) United States Patent
Won et al.

(10) Patent No.: US 10,747,343 B2
(45) Date of Patent: Aug. 18, 2020

(54) DISPLAY DEVICE

(71) Applicant: Samsung Display Co., Ltd., Yongin-si, Gyeonggi-do (KR)

(72) Inventors: Byeong Hee Won, Yongin-si (KR); Hye Yong Chu, Yongin-si (KR); Young Chan Kim, Yongin-si (KR); Byung Han Yoo, Yongin-si (KR); Won Sang Park, Yongin-si (KR)

(73) Assignee: Samsung Display Co., Ltd. (KR)

( * ) Notice: Subject to any disclaimer, the term of this patent is extended or adjusted under 35 U.S.C. 154(b) by 254 days.

(21) Appl. No.: 15/628,186

(22) Filed: Jun. 20, 2017

(65) Prior Publication Data

US 2018/0011563 A1    Jan. 11, 2018

(30) Foreign Application Priority Data

Jul. 7, 2016  (KR) .................. 10-2016-0086150

(51) Int. Cl.
| | |
|---|---|
| *G06F 3/041* | (2006.01) |
| *G06K 9/00* | (2006.01) |
| *G06F 3/044* | (2006.01) |
| *G06F 1/16* | (2006.01) |
| *G06F 21/32* | (2013.01) |

(52) U.S. Cl.
CPC ............ *G06F 3/041* (2013.01); *G06F 1/1643* (2013.01); *G06F 3/044* (2013.01); *G06F 21/32* (2013.01); *G06K 9/0002* (2013.01); *G06K 9/0008* (2013.01)

(58) Field of Classification Search
USPC ........................................................ 345/173
See application file for complete search history.

(56) References Cited

U.S. PATENT DOCUMENTS

| | | | |
|---|---|---|---|
| 2004/0130538 A1 | 7/2004 | Lin | |
| 2011/0102567 A1* | 5/2011 | Erhart | G06K 9/00053 348/77 |
| 2011/0267298 A1* | 11/2011 | Erhart | G06F 1/1626 345/173 |
| 2013/0169590 A1* | 7/2013 | Wickboldt | G02B 1/105 345/174 |
| 2013/0181949 A1* | 7/2013 | Setlak | G06K 9/0002 345/175 |

(Continued)

FOREIGN PATENT DOCUMENTS

| | | |
|---|---|---|
| CN | 105528105 A | 4/2016 |
| KR | 10-2016-0023945 A | 3/2016 |

(Continued)

OTHER PUBLICATIONS

Extended European Search Report corresponding to European Patent Application No. 17179979.4, dated Nov. 9, 2017, 8 pages.

(Continued)

*Primary Examiner* — Chineyere D Wills-Burns
(74) *Attorney, Agent, or Firm* — Innovation Counsel LLP (57) ABSTRACT

A display device includes a display panel displaying an image on one surface thereof, a substrate including a first surface and a second surface, wherein the first surface faces the display panel, and a first touch sensor provided between the display panel and the substrate, wherein the substrate includes a recess on the first surface, and the first touch sensor is arranged on at least a portion of the recess.

13 Claims, 6 Drawing Sheets

(56) References Cited

U.S. PATENT DOCUMENTS

| | | | | |
|---|---|---|---|---|
| 2014/0293154 | A1* | 10/2014 | Philipp | G02F 1/13338 349/12 |
| 2014/0327848 | A1 | 11/2014 | Fix et al. | |
| 2015/0109214 | A1 | 4/2015 | Shi et al. | |
| 2015/0195007 | A1* | 7/2015 | He | G06F 3/0416 455/41.1 |
| 2015/0371076 | A1* | 12/2015 | Lee | G06K 9/00013 382/124 |
| 2016/0070414 | A1* | 3/2016 | Shukla | G09G 3/20 345/178 |
| 2016/0216823 | A1* | 7/2016 | Setlak | G06F 3/0412 |
| 2016/0224178 | A1* | 8/2016 | Yang | G06F 1/1684 |
| 2017/0364763 | A1* | 12/2017 | Jin | G06F 3/0421 |
| 2017/0372110 | A1* | 12/2017 | Uehara | G06K 9/0002 |
| 2017/0372114 | A1* | 12/2017 | Cho | G01J 1/0233 |
| 2017/0372115 | A1* | 12/2017 | Lee | G06K 9/00006 |
| 2017/0372123 | A1* | 12/2017 | Kim | G06K 9/0002 |

FOREIGN PATENT DOCUMENTS

| | | |
|---|---|---|
| KR | 10-2016-0028367 A | 3/2016 |
| KR | 10-2016-0033330 A | 3/2016 |
| KR | 10-2016-0043217 A | 4/2016 |
| KR | 10-2016-0071352 A | 6/2016 |
| WO | WO2017079093 A1 | 5/2017 |

OTHER PUBLICATIONS

Park, Su Hyeong, "LG Innotek: Fingerprint Recognition by Touching the Tempered Glass of a Smartphone," May 1, 2016, http://www.zdnet.co.kr/news_news_view/asp?article_id=20160430115115, pp. 1-3.

EPO Office Action Report, Application No. 17179979.4, dated Feb. 28, 2019, 6 pages.

EPO Notice of Allowance was dated Jan. 30, 2020 with respect to the European Patent Application No. 17179979.4 filed on Jul. 6, 2017, 32 pages.

* cited by examiner

DISPLAY DEVICE

CROSS-REFERENCE TO RELATED APPLICATION

This application claims priority to and the benefit of Korean Patent Application No. 10-2016-0086150, filed on Jul. 7, 2016, which is hereby incorporated by reference for all purposes as if fully set forth herein.

BACKGROUND

Field

An embodiment of the present inventive concept relates to a display device.

Discussion of the Background

With the development of smartphones, a touch sensor embedded in a display device has been required to recognize a position when the display device is touched by a user's finger or an object.

Recently, a fingerprint sensor has been required to be included in the display device to recognize the fingerprints of users. The sensitivity essential for recognizing the fingerprint may be greater than the sensitivity required for detecting the touch. Therefore, research to increase the sensitivity of the touch sensor embedded in the display device has been ongoing.

SUMMARY

An embodiment of the present inventive concept provides a display device reducing a distance between a touch sensor and a user's finger by reducing a thickness of a substrate and reducing a decrease in the strength of the substrate caused by a reduced thickness of the substrate and an increase of visibility at a thinner portion of the substrate.

Exemplary embodiments of the inventive concept provide a display device including a display panel displaying an image on one surface thereof, a substrate including a first surface and a second surface, wherein the first surface faces the display panel, and a first touch sensor provided between the display panel and the substrate, wherein the substrate includes a recess on the first surface, and the first touch sensor is arranged on at least a portion of the recess.

According to an embodiment, the substrate may include a display area where the image is transmitted and a non-display area, except for the display area, a first sidewall of the recess is arranged in the non-display area and a second sidewall of the recess is arranged in the display area, and the first touch sensor is arranged in a bottom wall of the recess.

The display device may further include a printed circuit board electrically connected to the display panel, and a connecting wire electrically connecting the printed circuit substrate and the first touch sensor, wherein the connecting wire is arranged on the non-display area.

The first touch sensor may include at least one of aluminum, gold, nickel, titanium, platinum, chromium, copper, and a transparent conductive oxide.

The first touch sensor may include a stretched pattern and the stretched pattern includes a wave-like pattern.

The display device may further include a window substrate provided between the first touch sensor and the display panel and including a protrusion, wherein a shape of the protrusion corresponds to that of the recess, and the protrusion is arranged in a position corresponding to the recess.

The display device may further include a first adhesive layer provided between the substrate and the first touch sensor, a second adhesive layer provided between the first touch sensor and the display panel, a flexible film provided between the second adhesive layer and the display panel, and a third adhesive layer provided between the flexible film and the display panel and including a protrusion, wherein a shape of the protrusion corresponds to that of the recess and the protrusion is arranged in a position corresponding to the recess.

The display device may further include a flexible substrate arranged on the first touch sensor, wherein the flexible substrate includes a cutting line, and the cutting line corresponds to at least a portion of an outside of an area corresponding to the recess.

The first touch sensor may include a touch sensing pattern arranged on a bottom wall of the recess, and a stretched pattern arranged on a sidewall of the recess and connected to the touch sensing pattern, wherein the stretched pattern includes a wave-like pattern.

The display device may further include a second touch sensor provided on a same plane as the first touch sensor, wherein the first touch sensor is a fingerprint sensor, and the second touch sensor is a touch sensor.

The recess may be filled with an adhesive layer formed between the first touch sensor and the display panel.

The display device may further include a window substrate provided between the first touch sensor and the display panel and including a protrusion. A shape of the protrusion may correspond to that of the recess, and the protrusion may be arranged in a position corresponding to the recess.

DETAILED DESCRIPTION

Hereinafter, embodiments of the inventive concept will be described with reference to the accompanying figures in detail. In addition, even though shown on different drawings, like reference numerals refer to like elements throughout. In the following description, when the specific description with respect to well-known functions or configurations of the present inventive concept is determined to obscure the subject matter of the present inventive concept, a detailed description thereof will be omitted. In addition, the name of the constituent element used in the following detailed description has been selected in consideration for ease of description, thus may be different from the elements name of the actual product.

Herein, it should be understood that terms "include" or "have" are inclusive of characteristics, numerals, steps, operations, elements, parts or combination thereof, but are not exclusive of one or more different characteristics, numerals, steps, operations, elements, parts or combination thereof. Further, when an element, such as a layer, a film, a region or a plate, is referred to as being "on" another element, it can be directly on the another element or be on the another element with one or more intervening elements interposed therebetween. In addition, when an element, such as a layer, a film, a region or a plate, is referred to as being "on" another element, the direction where the element is formed is not limited to only an upper direction but includes the directions toward a side surface or a bottom. Also, when an element, such as a layer, a film, a region or a plate, is referred to as being "under" another element, it can be right under the another element or be under the another element with one or more intervening elements interposed therebetween.

Figure 1A:
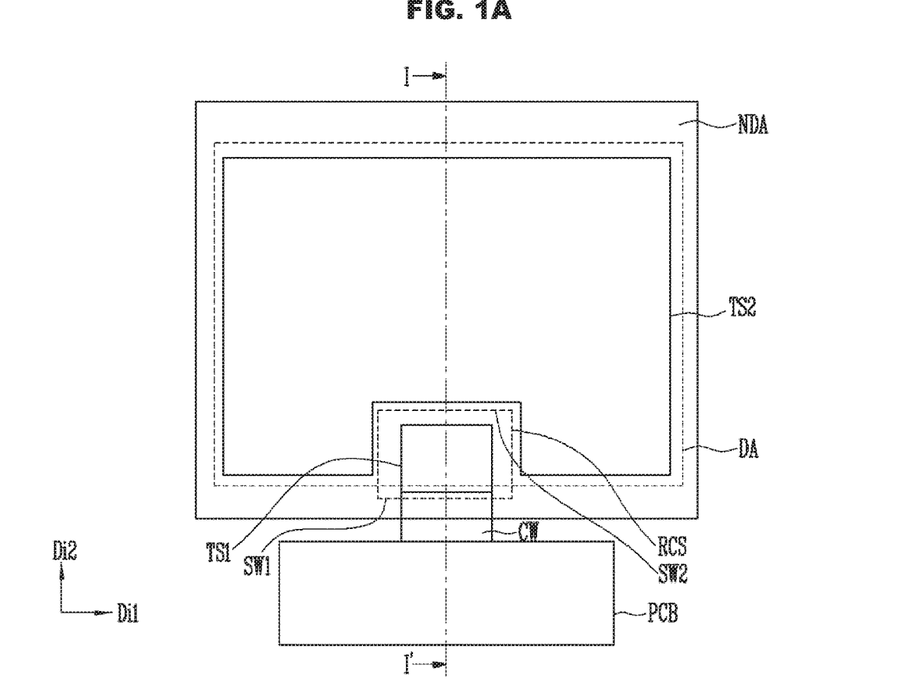
FIG. 1A is a view illustrating a display device according to an exemplary embodiment of the present inventive concept.
Figure 1B:
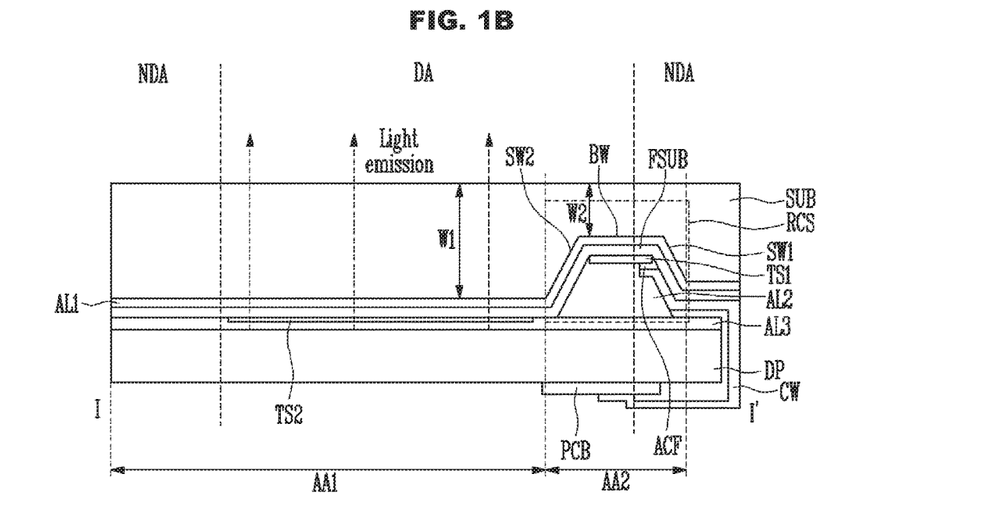
FIG. 1B is a cross-sectional view taken along line I-I' of FIG. 1A.

FIG. 1A is a view illustrating a display device according to an exemplary embodiment of the inventive concept, and FIG. 1B is a cross-sectional view taken along line I-I' of FIG. 1A.

Referring to FIGS. 1A and 1B, a display device according to an embodiment of the present inventive concept may include a display panel DP, a substrate SUB, a first adhesive layer AL1, a flexible substrate FSUB, a first touch sensor TS1, a second touch sensor TS2, an anisotropic conductive film ACF, a connecting wire CW, a printed circuit board PCB, a second adhesive layer AL2, and a third adhesive layer AL3.

An image may be displayed on one surface of the display panel DP. The display panel DP may have flexibility to be bent or folded. It is illustrated that the image is displayed on one surface of the display panel DP shown FIG. 1A, but the present inventive concept is not limited thereto. Images may be displayed on both sides of the display panel DP.

The substrate SUB may include an insulating material such as glass, an organic polymer, and crystal. In addition, the substrate SUB may have flexibility to be bent or folded. The substrate SUB may have a first surface and a second surface, and the first surface may face the display panel DP. The substrate SUB may have a display area DA in which the image is transmitted from the display panel DP and a non-display area NDA. The substrate SUB may include a first region AA1 having a first thickness W1 and a second region AA2 having a second thickness W2. A thickness of the thickest portion in the first region AA1 may be the first thickness W1 and a thickness of the thinnest portion in the second region AA2 may be the second thickness W2. The first surface of the substrate SUB may have a recess RCS, which may be arranged in the second region AA2. The second thickness W2 may be less than the first thickness W1. Specifically, the first thickness W1 may be at least 0.3 mm, and the second thickness W2 may be at most 0.1 mm. When the first thickness W1 is smaller than 0.3 mm, the strength of the substrate SUB may be weakened. In addition, when the second thickness W2 is larger than 0.1 mm, there may be a small difference in capacitance between the ridges and the valleys of a fingerprint. Therefore, it may be difficult to sense the fingerprint. The recess RCS may have a first sidewall SW1, a second sidewall SW2, and a bottom wall BW. The first sidewall SW1 may be arranged in the non-display area NDA, and the second sidewall SW2 may be arranged in the display area DA.

The first adhesive layer AL1 may be arranged between the substrate SUB and the display panel DP. The first adhesive layer AL1 may include a film and an adhesive material provided to both sides of the film and transmit light.

The flexible substrate FSUB may be provided between the first adhesive layer AL1 and the display panel DP. The flexible substrate FSUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

The first touch sensor TS1 may be provided between the flexible substrate FSUB and the display panel DP and arranged on the bottom wall BW of the recess RCS. A portion of the first touch sensor TS1 may be arranged in the display area DA, and the remaining portion of the first touch sensor TS1 may be arranged in the non-display area NDA. The first touch sensor TS1 may be a fingerprint sensor detecting a fingerprint of the user. The first touch sensor TS1 may have conductivity. When the first touch sensor TS1 is arranged on the bottom wall BW of the recess RCS, the first touch sensor TS1 may not need to have ductility since stress due to bending may not occur. Thus, the first touch sensor TS1 may include flexible metal (aluminum, gold, nickel, titanium, platinum, chrome, and copper) or non-flexible conductive material such as a transparent conductive oxide (an indium tin oxide, an indium zinc oxide, an aluminum-doped zinc oxide, a gallium indium zinc oxide, a zinc oxide, or a mixture thereof). The first touch sensor TS1 may not have ductility.

The second touch sensor TS2 may be provided between the flexible substrate FSUB and the display panel DP. That is, the second touch sensor TS2 may be formed of the same material and using the same process as the first touch sensor TS1. The second touch sensor TS2 may be arranged in the display area DA not to overlap the recess RCS in a plan view. The second touch sensor TS2 may be a touch sensor detecting the touch by a user. The second touch sensor TS2 may have conductivity and include one of aluminum, gold, nickel, titanium, platinum, chromium, copper, and a transparent conductive oxide. When the second touch sensor TS2 is arranged in an area not to overlap the recess RCS, the second touch sensor TS2 may not need to have ductility since stress due to bending may not occur. When the display panel DP includes the touch sensor, the second touch sensor TS2 may be omitted.

The anisotropic conductive film ACF may be provided between the first touch sensor TS1 and the display panel DP and arranged in the non-display area NDA. The anisotropic conductive film ACF may contact the first touch sensor TS1. The second touch sensor TS2 may contact a conductive film (not shown) in a similar way with the first touch sensor TS1, but the second touch sensor TS2 is omitted for the convenience of explanation.

The connecting wire CW may be provided between the anisotropic conductive film ACF and the display panel DP and arranged on the first sidewall SW1. The connecting wire CW may be electrically connected to the first touch sensor TS1 through the anisotropic conductive film ACF. The connecting wire CW may have flexibility and include a flexible printed circuit board FPCB. Since the image from the display panel DP does not reach the connecting wire CW, the image from the display panel DP may not be distorted by the connecting wire CW even though the connecting wire C2 does not transmit light.

The printed circuit board PCB may be connected to the connecting wire CW. The connecting wire CW in FIG. 1A is illustrated to be unfolded for explaining the connecting wire CW and the printed circuit board PCB. However, as for the actual display device, the connecting wire CW may be folded and the printed circuit board PCB is connected to the display panel DP as shown in FIG. 1B. The printed circuit board PCB may include a driving circuit (not shown) driving the display panel DP, or be connected to a driving circuit (not shown) arranged in the display panel DP and driving the display panel DP. The driving circuit (not shown) driving the display panel DP may be electrically connected to the first touch sensor TS1 through the connecting wire CW and the anisotropic conductive film ACF.

The second adhesive layer AL2 may be provided between the connecting wire CW and the display panel DP, and arranged in the recess RCS. Like the first adhesive layer AL1, the second adhesive layer AL2 may include an adhesive material and transmit light. The second adhesive layer AL2 may further include a film.

A material constituting the second adhesive layer AL2 may be selected so that a refractive index difference between the second adhesive layer AL2 and the substrate SUB may be smaller than a refractive index difference between air and the substrate SUB. A recess RCS filled with the second adhesive layer AL2 may not be seen as compared to the recess RCS filled with air. In addition, when the second adhesive layer AL2 fills the recess RCS, strength of the substrate SUB in an area having the recess RCS may increase as compared to the recess RCS filled with gas such as air, etc.

The third adhesive layer AL3 may be provided between the second adhesive layer AL2 and the display panel DP and the flexible substrate FSUB and the display panel DP. Like the first adhesive layer AL1, the third adhesive layer AL3 may include a film and an adhesive material provided to both sides and transmit light.

Figure 2A:
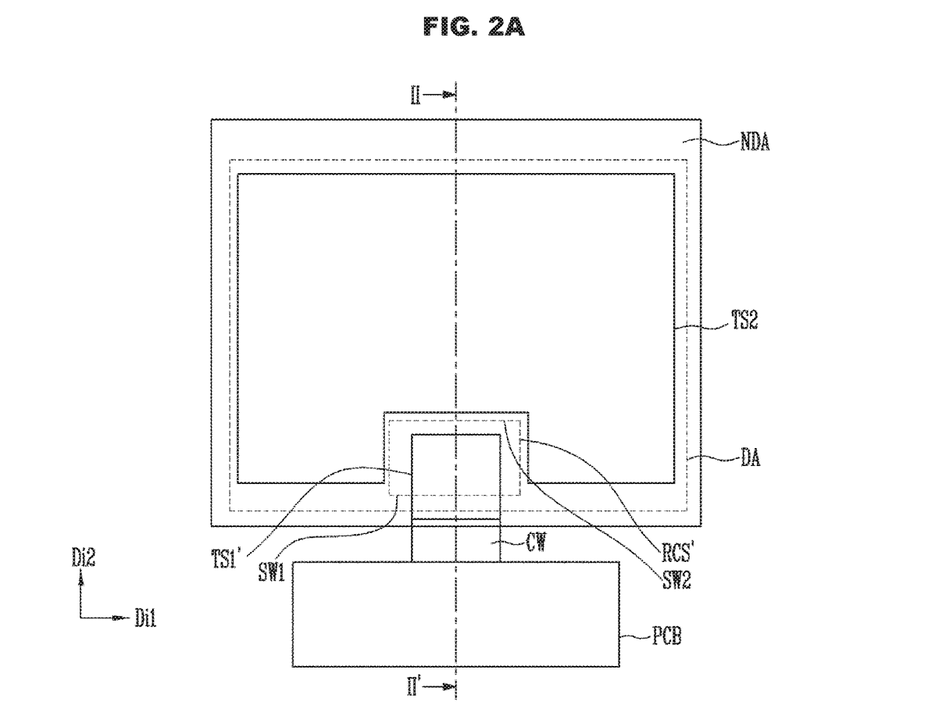
FIG. 2A is a view illustrating a display device according to another exemplary embodiment of the present inventive concept.
Figure 2B:
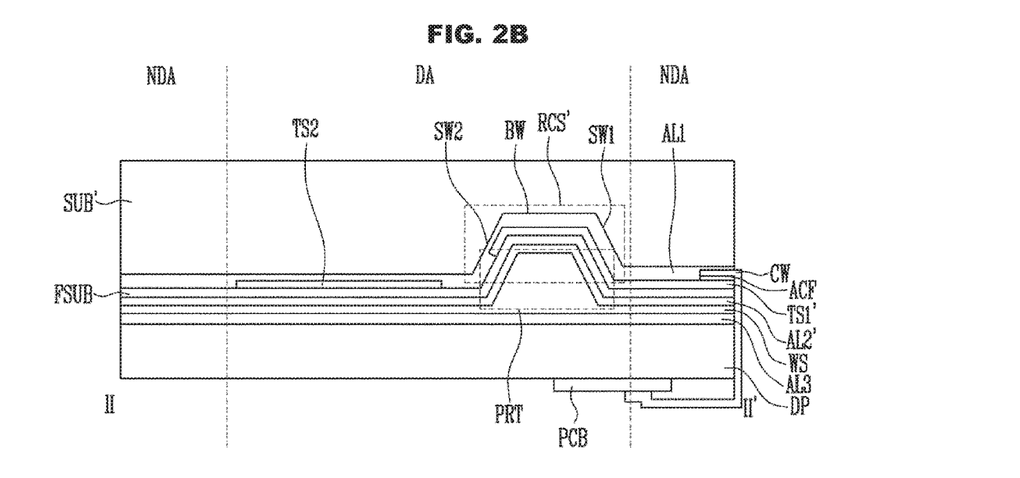
FIG. 2B is a cross-sectional view taken along line II-II' of FIG. 2A.

FIG. 2A is a view illustrating a display device according to another exemplary embodiment of the inventive concept, and FIG. 2B is a cross-sectional view taken along line II-II' of FIG. 2A.

Referring to FIGS. 2A and 2B, the display device according to an embodiment of the present inventive concept includes the display panel DP, a substrate SUB', the first adhesive layer AL1, the connecting wire CW, the anisotropic conductive film ACF, a first touch sensor TS1', the second touch sensor TS2, the flexible substrate F SUB, a second adhesive layer AL2', a window substrate WS, the printed circuit substrate PCB, and the third adhesive layer AL3. The detailed description substantially the same as that made with reference to FIGS. 1A and 1B may be omitted to avoid repetition.

The substrate SUB' may include a recess RCS'. Unlike the recess RCS, the recess RCS' may be arranged in the display area DA.

The connecting wire CW may be provided between the first adhesive layer AL1 and the display panel DP.

The anisotropic conductive film ACF may be provided between the connecting wire CW and the display panel DP.

The first touch sensor TS1' may be provided between the first adhesive layer AL1 and the display panel DP and contact the anisotropic conductive film ACF. Unlike the first touch sensor TS1, the first touch sensor TS1' may be arranged on a first sidewall SW1 of the recess RCS' in addition to the bottom wall BW of the recess RCS'. When the first touch sensor TS1' is arranged on the first sidewall SW1 of the recess RCS', the first touch sensor TS1' may need to have ductility since stress may occur due to bending. Therefore, the first touch sensor TS1' may include flexible metal (aluminum, gold, nickel, titanium, platinum, chrome, and copper.) When the first touch sensor TS1' includes a transparent conductive oxide which does not have ductility (an indium tin oxide, an indium zinc oxide, an aluminum doped zinc oxide, a gallium indium zinc oxide, a zinc oxide, or a mixture thereof), the first touch sensor TS1' may malfunction or be destroyed due to the stress. In addition, the first touch sensor TS1' arranged on the first sidewall SW1 may include a stretched pattern. The stretched pattern may include a wave-like pattern, and a stretching degree of the stretched pattern may be determined based on the amount of the applied stress.

The flexible substrate FSUB may be provided between the first touch sensor TS1' and the display panel DP.

The second adhesive layer AL2' may be provided between the flexible substrate FSUB and the display panel DP. Unlike the second adhesive layer AL2, the second adhesive layer AL2' may be arranged at an outside of the recess RSC' in addition to an inside of the recess RCS'.

The window substrate WS may include a material transmitting light, for example, glass, an organic polymer, and crystal. In addition, the substrate SUB' may have flexibility to be bent or folded. The window substrate WS may be provided between the second adhesive layer AL2' and the display panel DP and include a protrusion PRT. A shape of the protrusion PRT may correspond to that of the recess RCS' and the protrusion PRT may be arranged in a position corresponding to the recess RCS'. That is, the recess RCS' may be filled with the protrusion PRT of the window substrate WS. The advantage of the recess RSC' filled with the protrusion PRT of the window substrate WS in replacement of air has been already described with reference to FIGS. 1A and 1B.

The printed circuit board PCB may be connected to the connecting wire CW. The connecting wire CW in FIG. 2A is illustrated to be unfolded for explaining the connecting wire CW and the printed circuit substrate PCB. However, as for the actual display device, the connecting wire CW may be folded and the printed circuit board PCB may be connected to the display panel DP as shown in FIG. 2B.

The third adhesive layer AL3 may be provided between the window substrate WS and the display panel DP.

Figure 3A:
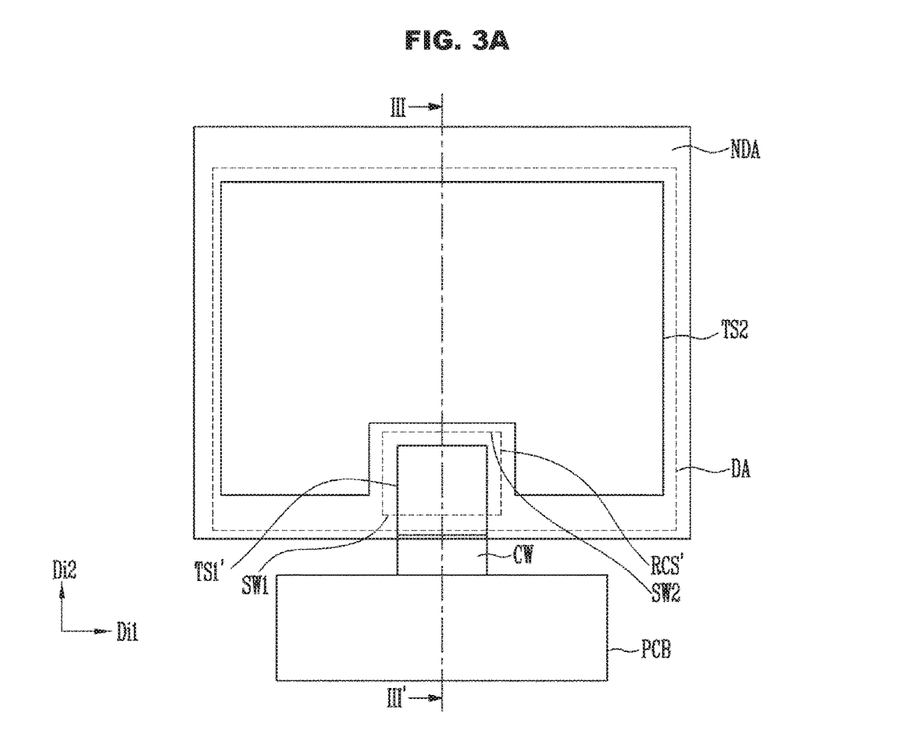
FIG. 3A is a view illustrating a display device according to another exemplary embodiment of the present inventive concept.
Figure 3B:
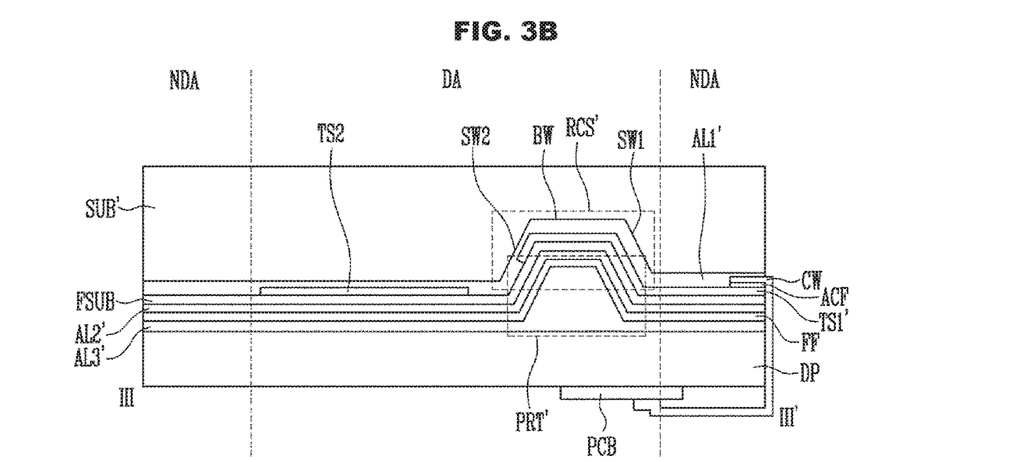
FIG. 3B is a cross-sectional view taken along line III-III' of FIG. 3A.

FIG. 3A is a view illustrating a display device according to another exemplary embodiment of the present inventive concept, and FIG. 3B is a cross-sectional view taken along line III-III' of FIG. 3A.

Referring to FIGS. 3A and 3B, the display device according to an embodiment of the present inventive concept may include the display panel DP, the substrate SUB', a first adhesive layer AL1', the connecting wire CW, the anisotropic conductive film ACF, and the first touch sensor TS1', the second touch sensor TS2, the flexible substrate FSUB, the second adhesive layer AL2', a flexible film FF, a third adhesive layer AL3' and the printed circuit substrate PCB. The detailed description substantially the same as that made with reference to FIGS. 1A, 1B, 2A and 2B will be omitted to avoid repetition.

The first adhesive layer ALF may include an adhesive material and have viscosity.

The flexible film FF may be provided between the second adhesive layer AL2' and the display panel DP. The flexible film FF may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose and cellulose acetate propionate.

The third adhesive layer AL3' may be provided between the flexible film FF and the display panel DP. The third adhesive layer AL3' may include an adhesive material and have viscosity. The third adhesive layer AL3' may have a protrusion PRT' unlike the third adhesive layer AL3. A shape of the protrusion PRT' may correspond to that of the recess RCS', and the protrusion PRT' may be arranged in a position corresponding to the recess RCS'. That is, the recess RCS' may be filled with the protrusion PRT' of the third adhesive layer AL3'. The advantage of the recess RCS' filled with the protrusion PRT' in replacement of air has been already described with reference to FIGS. 1A and 1B.

Figure 4A:
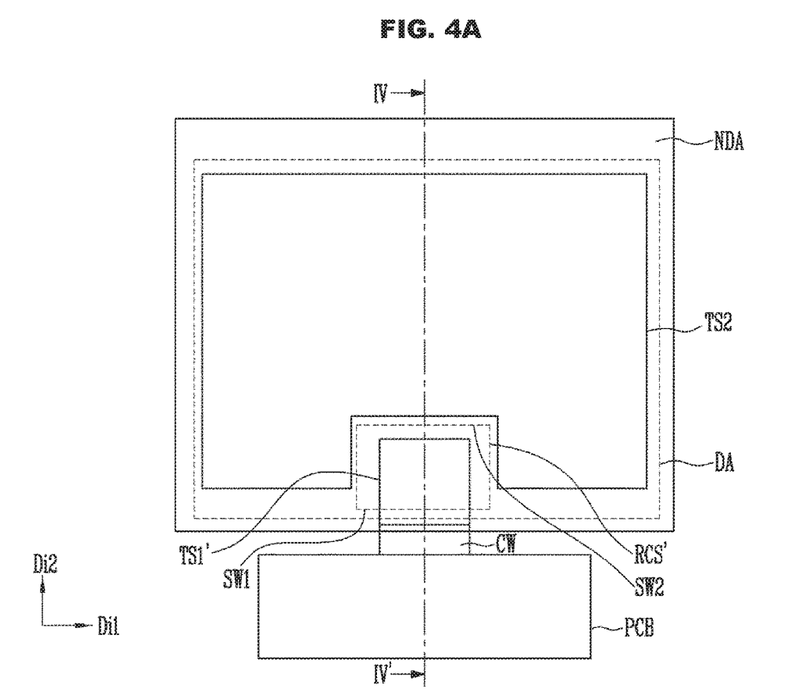
FIG. 4A is a view illustrating a display device according to another exemplary embodiment of the inventive concept.
Figure 4B:
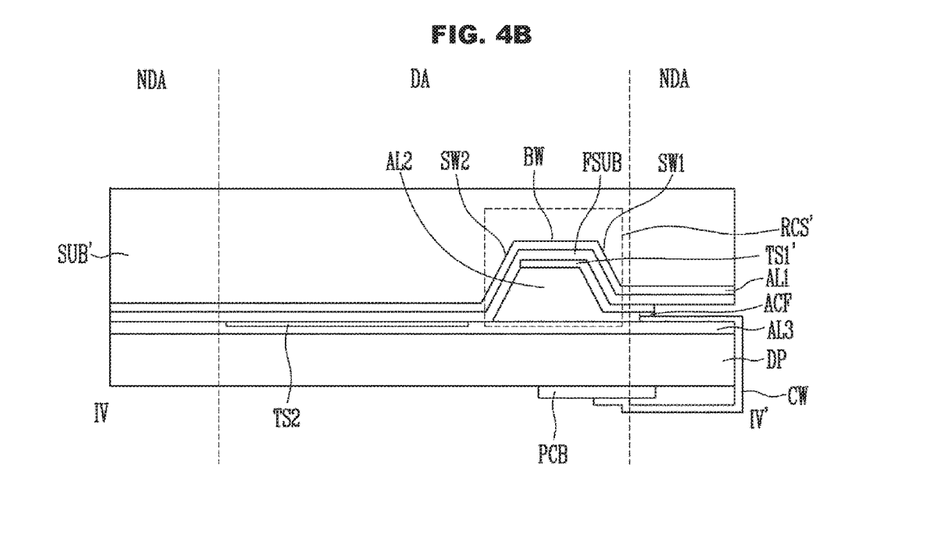
FIG. 4B is a cross-sectional view taken along line IV-IV' of FIG. 4A.

FIG. 4A is a view illustrating a display device according to another exemplary embodiment of the present inventive concept, and FIG. 4B is a cross-sectional view taken along line IV-IV' of FIG. 4A.

Referring to FIGS. 4A and 4B, the display device according to an embodiment may include the display panel DP, the substrate SUB', the first adhesive layer AL1, the flexible substrate FSUB, the first touch sensor TS1', the second touch sensor TS2, the anisotropic conductive film ACF, the connecting wire CW, the printed circuit substrate PCB, the second adhesive layer AL2, and the third adhesive layer AL3. The detailed description substantially the same as that made with reference to FIGS. 1A, 1B, 2A, 2B, 3A and 3B will be omitted to avoid repetition.

The first touch sensor TS1' may be provided between the flexible substrate FSUB and the second adhesive layer AL2. A portion of the first touch sensor TS1' may be arranged in the display area DA, and the remaining portion of the first touch sensor TS1' may be arranged in the non-display area NDA.

The anisotropic conductive film ACF may be provided between the first touch sensor TS1' and the display panel DP. The anisotropic conductive film ACF may be arranged in the non-display area NDA.

The connecting wire CW may be provided between the anisotropic conductive film ACF and the display panel DP. Since the image does not reach the connecting wire CW from the display panel DP, the image from the display panel DP may not be distorted by the connecting wire CW even though the connecting wire CW does not transmit light.

Figure 5A:
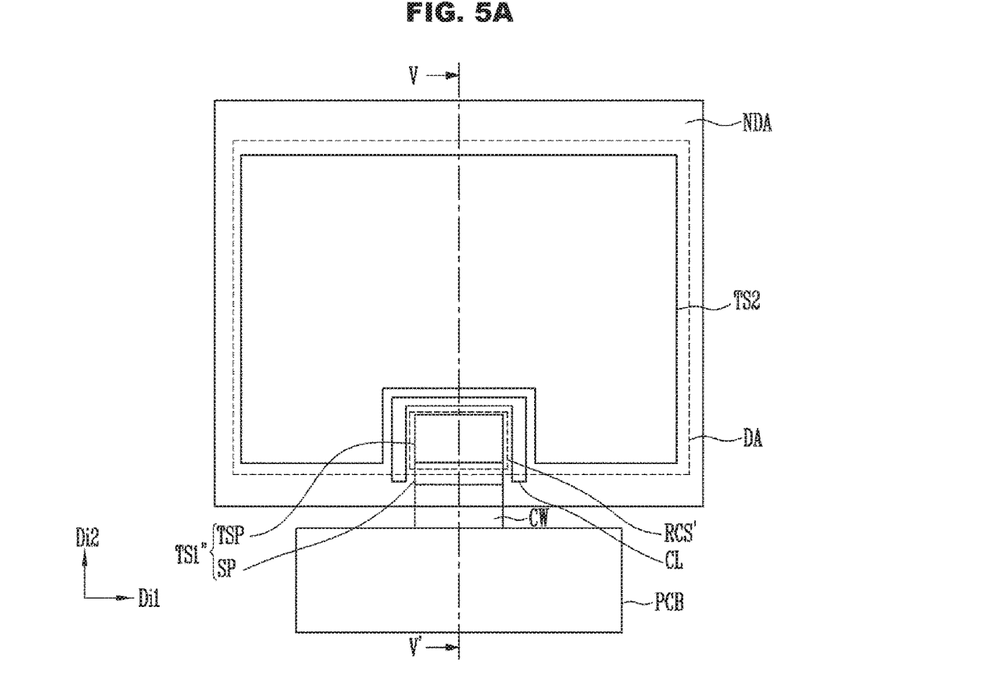
FIG. 5A is a view illustrating a display device according to another exemplary embodiment of the present inventive concept.
Figure 5B:
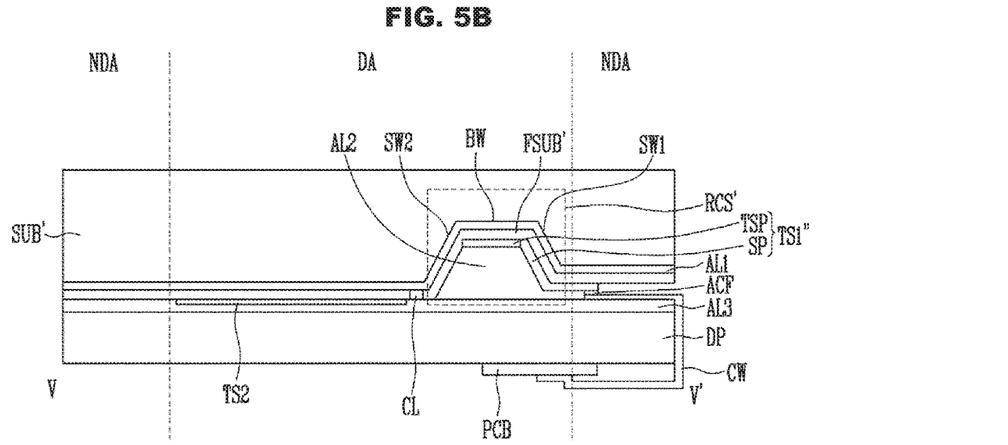
FIG. 5B is a cross-sectional view taken along line V-V' of FIG. 5A.

FIG. 5A is a view illustrating a display device according to another exemplary embodiment of the present inventive concept, and FIG. 5B is a cross-sectional view taken along line V-V' of FIG. 5A.

Referring to FIGS. 5A and 5B, the display device according to an embodiment may include the display panel DP, the substrate SUB', the first adhesive layer AL1, the flexible substrate FSUB', a first touch sensor TS1'', the second touch sensor TS2, the anisotropic conductive film ACF, the connecting wire CW, the printed circuit substrate PCB, the second adhesive layer AL2, and the third adhesive layer AL3. The detailed description substantially the same as that made with reference to FIGS. 1A, 1B, 2A, 2B, 3A, 3B, 4A and 4B will be omitted to avoid repetition.

The flexible substrate FSUB' may include a cutting line CL unlike the flexible substrate F SUB. The cutting line CL may correspond to at least a portion of an outer portion of an area corresponding to the recess RCS'. In an embodiment illustrated in FIG. 5A, the area corresponding to the recess RCS' may be a rectangle, and the cutting line CL may correspond to three sidewalls out of four sidewalls which are the outer portions of the rectangle. The cutting line CL may not correspond to the first sidewall SW1, but correspond to the second sidewall SW2. However, the present inventive concept is not limited thereto. In addition, the cutting line in FIG. 5B is illustrated to contain gas such as air, etc. However, the first adhesive layer AL1 or the third adhesive layer AL3 may fill the cutting line CL.

In the case of the flexible substrate FSUB illustrated in FIGS. 1A and 1B, stress may occur in positions where curves are formed by the sidewalls SW1 and SW2. On the other hand, in the case of the flexible substrate FSUB' illustrated in FIGS. 5A and 5B, stress may occur in a position where the curve is formed by the first sidewall SW1 of the recess RCS', but stress may not occur in a position where the curve is formed by the second sidewall SW2 due to the cutting line CL.

The first touch sensor TS1'' may include a stretched pattern SP and a touch sensing pattern TSP.

The touch sensing pattern TSP may be a fingerprint sensing pattern detecting the fingerprint of the user. The touch sensing pattern TSP may be provided on the bottom wall BW of the recess RCS'. According to an embodiment, the touch sensing pattern TSP may be provided on a sidewall corresponding to the cutting line CL of the sidewalls of the recess RCS'. For example, even though the touch sensing pattern TSP is provided on the second sidewall SW2, the stress caused by the curve may not occur in the touch sensing pattern TSP since the cutting line CL may correspond to the second sidewall SW2. Since stress does not occur in the touch sensing pattern TSP, a stretchable pattern such as a wave-like pattern may not need to be used. According to the display device illustrated in FIGS. 5A and 5B, even though the touch sensing pattern TSP is arranged on the second sidewall SW2, the stretchable pattern such as a wave-like pattern may not need to be used. Thus, the pattern design for sensing may be easily made.

The stretchable pattern SP may be provided on the first sidewall SW1 of the recess RCS' and include a wave-like pattern. The first sidewall SW1 of the recess RCS' may not correspond to the cutting line SL and stress may occur. However, the stretchable pattern SP including a wave-like pattern may not malfunction or not be destroyed due to the stress but rather may stretch.

Figure 6:
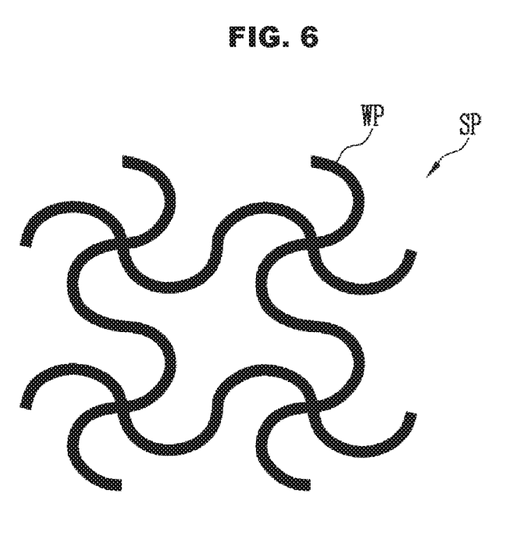
FIG. 6 is a view illustrating a shape of a stretching electrode used in a display device according to an exemplary embodiment of the present inventive concept.

FIG. 6 is a view illustrating a shape of an electrode used in a display device according to an exemplary embodiment of the present inventive concept. The stretchable pattern SP may include a wave-like pattern WP. However, the wave-like pattern WP is an example, and the stretchable pattern SP may include various shapes such as a zig-zag shape, a serpentine shape, etc.

An embodiment of the present inventive concept produces an effect of providing a display device reducing a distance between a touch sensor and a user's finger by reducing a thickness of a substrate, reducing a decrease in the strength of the substrate caused by a reduced thickness of the substrate, and reducing a visibility at a thinner portion of the substrate.

Although certain exemplary embodiments and implementations have been described herein, it is to be understood by a person of ordinary skill in the art that various changes and modifications may be made in the inventive concept without departing from the spirit and scope thereof. Therefore, the true technical scope of the present disclosure is not limited to such embodiments, but rather to the scope of the appended claims.

What is claimed is:

1. A display device, comprising:
   a display panel displaying an image on one surface thereof;
   a substrate including a first surface and a second surface, wherein the first surface faces the display panel;
   a first touch sensor provided between the display panel and the substrate;
   a window substrate provided between the first touch sensor and the display panel to overlap the first touch sensor and the display panel in a plan view, the window substrate including a protrusion protruded toward the substrate;
   a first adhesive layer provided between the first touch sensor and the window substrate; and
   a second adhesive layer provided between the window substrate and the display panel,
   wherein the substrate includes a recess on the first surface, and the first touch sensor is arranged on at least a portion of the recess, and
   a shape of the protrusion corresponds to that of the recess, and the protrusion is arranged in a position corresponding to the recess.

2. The display device of claim 1, wherein the substrate includes a display area where the image is transmitted and a non-display area, except for the display area,
   a first sidewall of the recess is arranged in the non-display area and a second sidewall of the recess is arranged in the display area, and
   the first touch sensor is arranged in a bottom wall of the recess.

3. The display device of claim 2, further comprising:
   a printed circuit board electrically connected to the display panel, and
   a connecting wire electrically connecting the printed circuit board and the first touch sensor.

4. The display device of claim 3, wherein the connecting wire is arranged on the non-display area.

5. The display device of claim 2, wherein the first touch sensor includes at least one of aluminum, gold, nickel, titanium, platinum, chromium, copper, and a transparent conductive oxide.

6. The display device of claim 1, wherein the first touch sensor includes a stretched pattern and the stretched pattern includes a wave-like pattern.

7. The display device of claim 1, further comprising:
   a flexible film provided between the first touch sensor and the window substrate; and
   a third adhesive layer provided between the substrate and the first touch sensor,
   wherein the first adhesive layer is provided between the flexible film and the window substrate.

8. The display device of claim 1, further comprising a flexible substrate arranged on the first touch sensor,
   wherein the flexible substrate includes a cutting line, and
   the cutting line surrounds an outside of an area corresponding to the recess not to overlap the recess in a plan view.

9. The display device of claim 8, wherein the first touch sensor comprises:
   a touch sensing pattern arranged on a bottom wall of the recess; and
   a stretched pattern arranged on a sidewall of the recess and connected to the touch sensing pattern,
   wherein the stretched pattern includes a wave-like pattern.

10. The display device of claim 1, further comprising a second touch sensor provided on a same plane as the first touch sensor,
    wherein the first touch sensor is a fingerprint sensor, and the second touch sensor is a touch sensor.

11. The display device of claim 10, wherein the recess is filled with the first adhesive layer.

12. The display device of claim 1, wherein the substrate includes a first region having a first thickness and a second region having a second thickness less than the first thickness, and
    wherein the recess is arranged in the second region.

13. The display device of claim 12, wherein the first thickness is at least 0.3 mm and the second thickness is at most 0.1 mm.

* * * * *